United States Patent
Schnitzer

[15] 3,691,644
[45] Sept. 19, 1972

[54] METHOD AND ARRANGEMENT FOR THE CONTINUOUS THERMAL TREATMENT OF GRANULAR MATERIAL WITH A GAS

[72] Inventor: Hans Schnitzer, Winterthur, Switzerland

[73] Assignee: Gebrueder Buehler AG Uzwill, St. Gallen, Switzerland

[22] Filed: Jan. 12, 1971

[21] Appl. No.: 105,922

[30] Foreign Application Priority Data

Jan. 14, 1970 Switzerland..................468/70

[52] U.S. Cl. ..............................34/10, 34/57, 62/57
[51] Int. Cl...............................................F26b 3/08
[58] Field of Search..........34/57 A, 57 R, 57 B, 57 C, 34/10

[56] References Cited

UNITED STATES PATENTS

| | | | |
|---|---|---|---|
| 2,316,664 | 4/1943 | Brassert | 34/57 A |
| 2,502,953 | 4/1950 | Johnig | 34/57 R |
| 2,629,938 | 3/1953 | Montgomery | 34/57 A |
| 2,513,369 | 7/1950 | Shaw | 34/57 A |
| 3,003,752 | 10/1961 | Frost | 34/57 A |
| 3,040,439 | 6/1962 | Frost | 34/57 A |
| 3,360,867 | 1/1968 | Sanderson | 34/10 |
| 3,492,740 | 2/1970 | Gripel | 34/57 A |
| 3,546,787 | 12/1970 | Horner | 34/57 A |
| 3,595,541 | 7/1971 | Pabich | 34/57 A |

Primary Examiner—William J. Wye
Attorney—McGlew and Tuttle

[57] ABSTRACT

A device for the continuous thermal treatment of a granular material by means of a gas comprises a container having an inlet for the granular material which opens into a chamber arranged above a stationary gas-permeable material support which may be in the form of an inclined perforated wall. The container includes walls around the support, one of which at least includes a material outlet, for example, which is arranged at the lower end of the support. A gas is directed upwardly against the support at a plurality of separated areas in a flow stream which is regulated to maintain the material in a homogeneous loose fluid bed above the support. Means are provided at the outlet for effecting an infinitely vertically adjustable overflow. A throttling device is arranged in the flow paths of the fluid at a location before the support in order to selectively vary the velocity of gas flowing through the support and along the feed travel of the fluid bed of granular material. In accordance with the method of the invention, the granular material is directed into the chamber above the stationary support and the overflow to the outlet is set at a predetermined level. Thereafter, a treatment gas is directed through at least two distinct paths alternately upwardly through separate divided portions of this support. The gas flow is controlled so that there is an alternate flow first to one side and then to another side of the fluid bed and thence outwardly through the outlet along with the granular material which moves over the bed level.

19 Claims, 3 Drawing Figures

INVENTOR.
HANS SCHNITZER
BY
McGlew & Tuttle

METHOD AND ARRANGEMENT FOR THE CONTINUOUS THERMAL TREATMENT OF GRANULAR MATERIAL WITH A GAS

SUMMARY OF THE INVENTION

This invention relates in general to a method and arrangement for the continuous treatment of granular material and, in particular, to a new and useful method and device for the continuous thermal treatment of granular material by the passage of a gas therethrough in a manner to maintain the material as a loose fluid bed and to thereafter flow through an outlet when it reaches a predetermined height level in the treatment chamber.

It is known to move granular material of different specific gravity and different grain size over a downwardly inclined air-permeable material support provided for drying or cooling. The treatment gas is blown through the material support from chambers which are oriented perpendicularly to the travelling direction of the material and it is returned to the pulsating current of gas flow at an adjustable velocity. In addition, an air current is provided between two adjacent chambers which extend over the entire width of the material support and which is blown from the bottom to the top through the material layer in order to prevent separation of the material in accordance with the specific gravity thereof in the fluid bed.

If the granular material comprises substantially uniform grains with respect to grain size, grain form, specific gravity, thermal conductivity and specific heat, and if this granular material must be cooled or heated uniformly to a desired temperature, this can be done, depending upon the inlet temperature of the material, in the known arrangements, wither by passing the material several times through the zone of heating or by varying the gas temperature. In the former case, the output in weight per unit of time drops and the end temperature can be merely varied within rough limits. In the latter case, a desired end temperature with a constant output can be obtained at the expense of a correspondingly great technical expenditure and energy expenditure.

In accordance with the present invention, there is provided an arrangement for the thermal treatment of substantially uniform granular material where a constant outlet temperature of the grains is obtained with a constant output of grain material and with a constant gas temperature. This is achieved, in accordance with the invention, by supporting the material on a perforated fixed support so that it is separated from the outlet by an infinitely vertically adjustable overflow. A fluid bed is maintained above the support by the flow of the treatment gas through the support and through the granular material. A controllable throttle is provided in the current path of the gas at a location before the perforated support in order to selectively vary the velocity of gas flowing through the material support along the path of the fluid bed. In the preferred arrangement, the fluid path is divided into a plurality of paths, for example two paths which are separated by a central partition arranged below the perforated support.

Accordingly, it is an object of the invention to provide an improved method of treating a granular material with a gas which comprises directing the material onto a perforated support and permitting the material to flow outwardly from the top of a chamber bounding the support through an overflow at a seclected overflow height, and simultaneously directing the treatment fluid through the perforated support to maintain the bed in a fluid condition alternately at separate areas from beneath the support.

A further object of the invention is to provide a device for the treatment of granular material which includes a container defining a treatment chamber having a perforated support therein onto which the granular material to be treated is directed and which includes an outlet at one end with means for regulating the heighth of overflow outwardly through the outlet, and wherein there is fan means provided for directing a treatment fluid upwardly through the support preferably at a plurality of separated areas and preferably with means for cyclicly and alternately directing the fluid from one area to the other.

A further object of the invention is to provide a device for the treatment of granular materials which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

GENERAL DESCRIPTION OF THE PREFERRED EMBODIMENT

Figure 1:
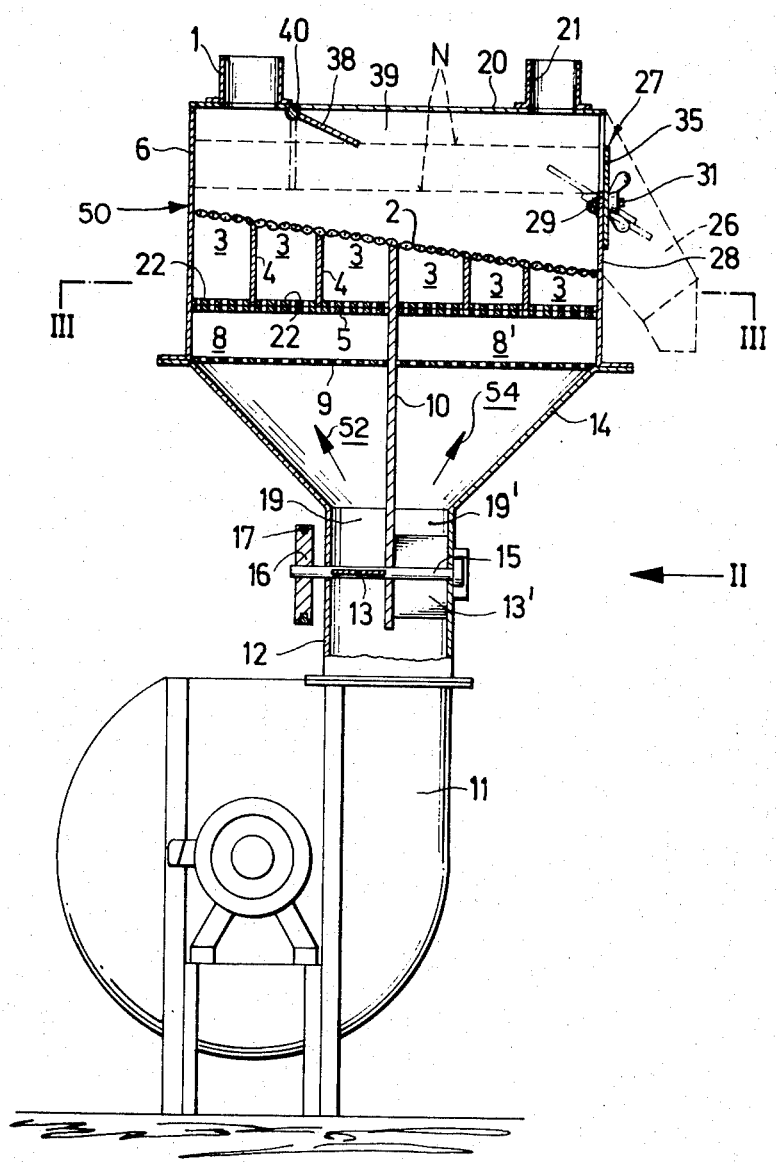
FIG. 1 is a partial side elevational and partial vertical sectional view taken along the line I—I of FIG. 2 of a device for treating granular material constructed in accordance with the invention.

Referring to the drawing in particular, the invention embodied therein comprises, a thermal treatment device for use in treating plastic granular material and in the arrangement shown, the treatment device comprises a cooler, generally designated 50, for a plastic granular material which is arranged behind a plasticizer (not shown). The granular material is fed from the plasticizer through an inlet 1 of the cooler 50 and it moves onto an inclined perforated material support member or plate 2. The plate 2 is arranged within a container 6 defining a fluid bed chamber portion 39 above the support 2 and a gas flow chamber part below the support 2 which is divided up into a plurality of small size chambers 3 which are separated by division walls 4. The chambers 3 are located above a group of perforated plates 22 which are mounted for displaceable movement on the perforated plate 5 which divides the bottom of a housing or container 6. The walls 4 separating the chambers 3 are impermeable to air and are oriented transverse to the feed travel of the granular material on a support 2. The perforated plate 5 is rigidly connected with the housing 6 at its edges and it includes a plurality of uniformly distributed gas inlet orifices 7 (FIG. 3) through which the air flows from larger size pressure-equalizing chambers 8 and 8'.

The underside of the container 6 below the support 2 is divided by a partition plate 10 to form the equalizing chambers 8 and 8' which are bounded at their lower ends by another perforated plate 9 which is disposed across the gas flow path at the top of a connecting funnel 14.

In accordance with the invention, the treatment gas such as air, is fed to the support 2 from its bottom by a fan 11 which has throttle regulating means (not shown) for varying its delivery rate into a control passage 12 leading to the funnel-shaped part 14.

The control passage 12 contains a rotary shaft 15 having a flap 13 and 13' in respective side passages 19 and 19'. The shaft 15 carries a pulley 16 which is rotated by a driving motor 18 through a belt 17. Air which is discharged by the fan 11 moves through the control passage 12 and is alternately permitted to flow through either the passage 19 or 19' in accordance with the position of the flaps 13 and 13'. The arrangement is such that there is an alternating pulsating air flow in the direction of the arrows 52 and 54 on the respective sides of the partition 10 and thence upwardly through the passages 8 and 8' and the passages 3 through the support 2 and through the bed of granular material thereon.

It is possible to arrange the control conduit 12 and the partition 10 so that they are staggered by 90° so that it separates the air current parallel to the feed travel of the granular material rather than transversely thereto as indicated. Instead of two separate air supply systems as shown, there may be any number with the distribution being effected by a distributor control passage 12 similar to the one indicated in FIG. 1. In this manner, a pulsating gas is fed simultaneously to only half the area portion above the support 2 at any time.

In the embodiment shown, the flaps 13 and 13' are arranged on the shaft 15 at 90° intervals. During rotation of the shaft, the flaps 13 and 13' alternately close and open the air ducts 19 and 19' so that pulsating air currents are fed to the material support 2. The housing or container 6 is closed at the top by a cover plate 20 which has the inlet 1 at one end and an outlet orifice 21 at its opposite end through which the treatment gas may flow.

Figure 3:
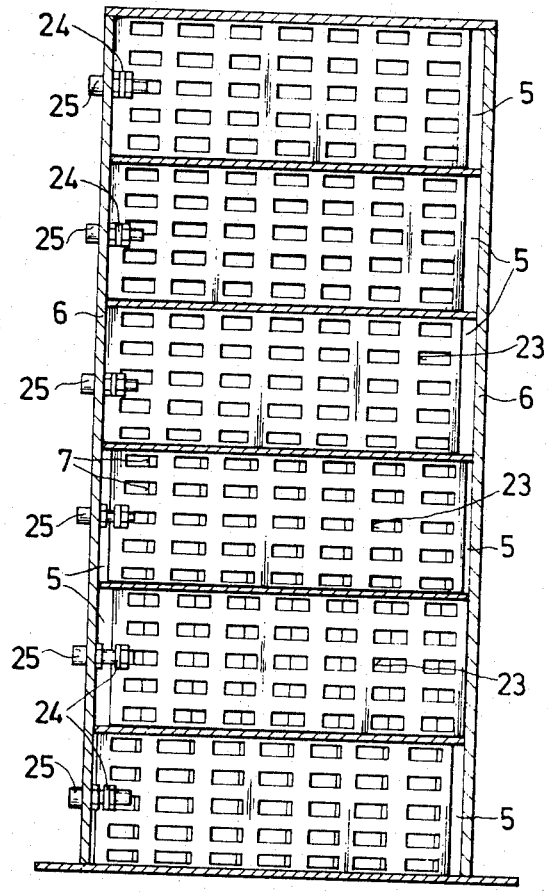
FIG. 3 is a section taken along the line III—III of FIG. 1.

The additional perforated plates 22 provide means for selectively regulating the amount of air passing through the material support 2 at any location along the feed travel of the granular material. The holes 23 of the perforated plates 22 (FIG. 3) have the same size and form as the gas inlet orifices 7, and also have the same arrangement and distribution. To each gas inlet orifice 7 is thus assigned a corresponding opening or hole 23. The length of the perforated plates is less than the distance of the opposing walls of the housing 6, as shown in FIG. 3, so that the inside cross-section of the gas inlet orifices 7 is varied in a longitudinal displacement of the perforated plates 22.

Figure 2:
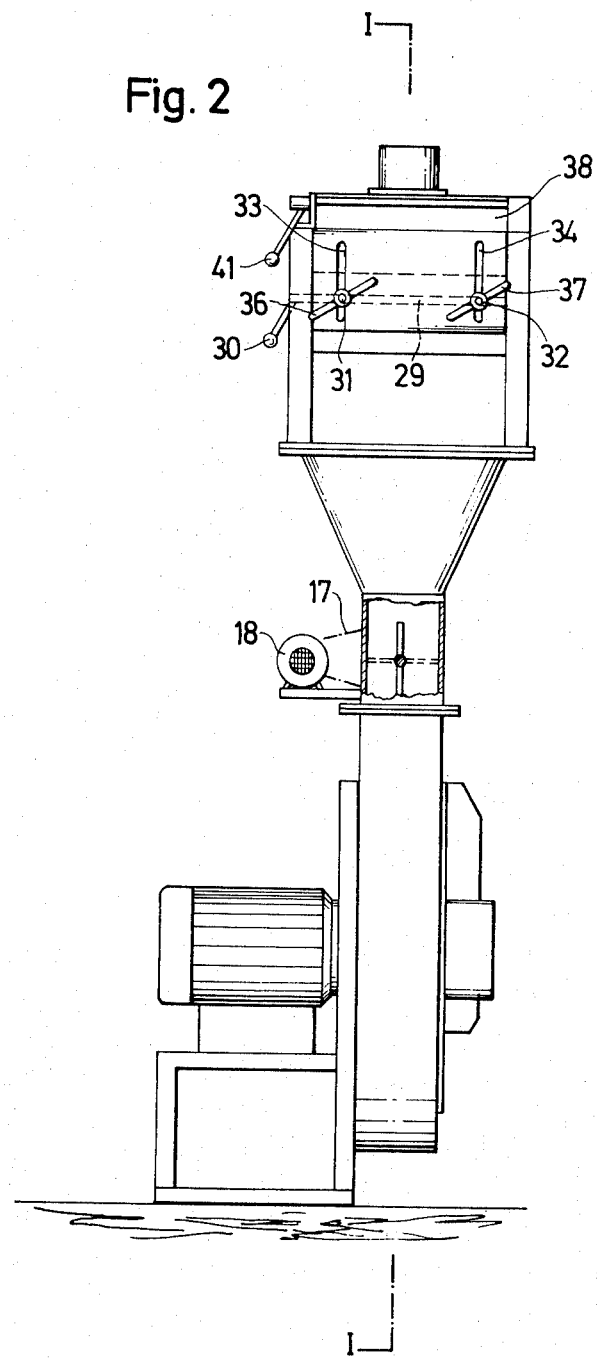
FIG. 2 is a side elevational view partially in section of the device shown in FIG. 1.

In order to be able to regulate the inside cross-section of the gas inlet orifices 7 in the various chambers selectively from the outside, an angle plate 24 is secured on each perforated plate 22 and it has a threaded bore which carries a threaded nimbus screw 25. The screw 25 is also rotatably mounted in a wall of the housing 6. Because the inside cross-section of the gas inlet orifices 7 can be regulated in each chamber 3, it is possible to control the amount of air passing through the material support 2 along the feed travel of the granular material. The container 6 has an outlet 26 at one end into which the granular material flows and it is arranged to feed through a bucket wheel lock (not shown) to a pneumatic conveyor system (not shown). The outlet 26 is separated from the material treatment chamber 39 by an overflow control member 27 which is adjustably positioned in respect to an end wall or plate 28. The plate carries a shaft 29 which is rotatably mounted with its ends in the wall of the housing 6. One end of the shaft 29 carries a lever 30 (FIG. 2) with which the plate 28 can be turned into an inclined position, as shown in FIG. 1 in dotted lines, in order to permit the discharge of the granular material from the treatment chamber 39 after a cooling period has taken place.

On the plate 28, there are secured two screw bolts 31 and 32, which engage through slots 33 and 34, of a plate 35, which is of the same length as the plate 28. Plate 35 can be adjusted vertically relative to the plate 28 and it can be locked in any position along the movement of the path of the bolts 31 and 32 in the respective slots 33 and 34. The locking is accomplished by means of wing nuts 36 and 37 which are screwed onto the associated screw bolts 31 and 32 to secure them in a fixed adjusted position. Due to the vertical adjustability of the overflow 27, it is possible to vary the level line N of the homogeneous loose fluid bed on the material support 2.

Directly adjacent the inlet 1, there is mounted a plate 38 which is pivoted on a pivot 40 which is rotatably mounted in the wall of the housing 6. At one end, shaft 40 is rigidly connected with a lever 41 with which it can be turned from the outside of the housing so that it may be oriented in an inclined position so that its bottom edge is flush with the level line N as determined by the heighth of the overflow 27. The plate 38 has the advantage that the current of the granular material which widens conically from the inlet 1 is aligned rapidly and uniformly with the level N. Another advantage is that the individual grains issuing from the inlet 1 are not pulled by the air current into the air outlet orifice 21.

The operation of the device is as follows:

The granular material is continuously charged through the inlet 1 onto the material support 2. At the same time, the air is blown intermittently from the fan 11 through the perforated plate 9, the perforated plate 5, and the perforated plates 22 and through the material support 2 and is evacuated through the air outlet orifice 21. The amount of air must be so selected that a homogeneous loose fluid bed is formed on the material support 2. The homogeneous loose fluid bed will align itself with the level N which is determined by the overflow 27. The granular material, which behaves on a material support 2 like a liquid, flows continuously through the overflow 27 into the outlet 26. A nominal output of the cooler and a nominal temperature of the issuing grains can be achieved during the cooling of the granular material of larger or smaller grain size, of higher or lower inlet temperature, of higher or lower thermal conductivity, or of greater or smaller heat storing capacity by raising or lowering the level N. Raising of the level N results in an increase of the stay period of the individual grains in the cooler and the opposite is true in respect to the lowering of the level. This rule applies only if a homogeneous loose fluid bed is always ensured independently of the level N. To this end, the inside cross-section of the gas inlet orifices 7 can be varied along the feed of travel of the granular material on the support 2. Preferably, one of the side walls of the housing 6 is formed by a glass plate so that it can be easily visually observed if the granular material along its feed of travel on material support 2 is in the state of a homogeneous loose fluid bed. If this homogeneous loose fluid bed should be only formed locally at one point of support 2, the inside cross-section of the gas inlet orifices under this fluid bed can be varied by turning the nimbus screws 25 which control the perforated plate 22, and the fluid bed can be corrected locally as required.

While a specific embodiment of the invention has been shown and described in detail to illustrate the application of the principles of the invention, it will be understood that the invention may be embodied otherwise without departing from such principles.

What is claimed is:

1. A device for treating a granular material with a treatment gas, comprising a housing having an interior defining a granular material bed chamber with a spaced apart inlet and outlet for granular material and an outlet for treatment gas, adjustable granular material overflow means separating the bed chamber from the outlet, a gas-permeable support plate extending across the bottom of said granular material bed chamber and providing a support for the granular material, means defining at least two separate treatment gas passages through said support plate, and fan means connected to direct cyclically a treatment gas flow and to cut off the flow through said gas passages and respective portions of said support plate and at rates to maintain the bed of granular material in a fluid state along the various portions of said plate.

2. A device for treating a granular material with a treatment gas, according to claim 1, wherein said inlet is located adjacent one end of said support plate, and said outlet for the granular material is located adjacent the opposite end, said material being movable from said inlet toward said outlet, said fan partition means including means dividing the flow of treatment air along the length of said plate from said inlet to said outlet and for regulating said divided flow.

3. A device for treating a granular material with a treatment gas, according to claim 1, wherein said support extends downwardly from said inlet to said outlet for the granular material.

4. A device for treating a granular material with a treatment gas, according to claim 1, wherein said fan means includes a fan having a discharge with throttle means associated therewith, said fan discharging into a plurality of chambers located below said support plate.

5. A device for treating a granular material with a treatment gas, according to claim 4, wherein said plurality of passages each includes at least one gas inlet orifice for the flow of the gas from said fan and means for varying the size of the orifice.

6. A device for treating a granular material with a treatment gas, comprising a housing having an interior defining a granular material bed chamber with an inlet adjacent one end of said chamber and an outlet adjacent the opposite end of said chamber for said granular material, a treatment gas outlet adjacent the top of said chamber, adjustable granular material overflow means separating the bed chamber from said outlet for the granular material, a gas-permeable support plate extending across the bottom of said granulated material bed chamber from said inlet to said outlet for the granular material and providing a support for the granular material during its treatment and movement, a fan having a discharge connected to said housing below said support plate, a partition dividing said housing below said support plate into at least two gas flow chambers, and cyclically movable valve means at the entrance into said gas chambers located between said fan and the connection to said flow chambers for effecting cyclical flow and cut off of flow through each of said chambers to subject the areas of said support plate overlying said chambers to flow therethrough at different times.

7. A device for treating a granular material with a treatment gas, according to claim 6, wherein each of said chambers are divided below said support member into a plurality of additional chambers.

8. A device for treating a granular material with a treatment gas, according to claim 7, including perforated plate means below each of said additional chambers for regulating the flow of air through each of said chambers.

9. A device for treating a granular material with a treatment gas, according to claim 8, wherein said means for regulating the flow through each of said chambers includes a perforated plate located in spaced location from the bottom of said support plate and having means for varying the size of the perforations therein.

10. A device for treating a granular material with a treatment gas, according to claim 6, wherein the connection of said fan to the underside of said support plate is divided by a partition wall to form first and second flow paths, and a plurality of perforated plates extending across said flow paths at spaced locations therealong.

11. A device for treating a granular material with a treatment gas, according to claim 6, wherein said overflow means includes a wall having an overflow opening and an adjustable closure member connected to said wall and being pivotal away from the latter to vary the opening and the heighth of the fluid bed which feeds over the opening.

12. A device for treating a granular material with a treatment gas, according to claim 6, wherein said support plate extends downwardly from said inlet to said outlet and wherein the connecting space from said fan to the underside of said support plate is divided into a plurality of individual gas flow chambers extending along the length of said plate from said inlet to said outlet said fan being connected to discharge into each of said chambers, and means for selectively regulating the flow to each of said chambers.

13. A device for treating a granular material with a treatment gas, according to claim 6, wherein the connection between said fan and the underside of said support plate is divided into identical flow area portions below said plate related to the direction of flow of material on said plate said flow area each being connected to said fan for directing a gas through said plate and said chambers.

14. A method for treating granular material with a treatment gas using a perforated support plate for the material, means for feeding the granular material onto the support plate and maintaining it at a predetermined level, and a fan for supplying treatment gas to the material, comprising dividing the flow of air from the fan into two separate flow paths which are directed from the opposite side of the plate through the plate and the material thereon in order to fluidize the material, and periodically interrupting the flow to each of the flow paths in order to vary the pulsing of the gas treatment through the support plate.

15. A method for treating a granular material with a treatment gas, according to claim 14, wherein each of the two flow paths are further divided into separate passages extending along the length of the support plate along which the material is fed, and including directing the separate flow paths through the individual flow passages below the support plate and regulating the flow of the gas through each of the passages in order ensure that the entire bed is maintained in a fluidized condition.

16. A method for treating a granular material with a treatment gas, according to claim 14, including throttling the gas flow through selected ones of the individual flow passages in order to provide a flow control for the treatment gas passing through said support plate.

17. A device for treating a granular material with a treatment gas, comprising a housing having an interior defining a granular material bed chamber with an inlet adjacent one end of said chamber and an outlet adjacent the opposite end of said chamber for said granular material, a treatment gas outlet adjacent the top of said chamber, adjustable granular material overflow means separating the bed chamber from said outlet for the granular material, a gas-permeable support plate extending across the bottom of said granulated material bed chamber from said inlet to said outlet for the granular material and providing a support for the granular material during its treatment and movement, a fan having a discharge connected to said housing below said support plate, a partition dividing said housing below said support plate into at least two gas flow chambers, and valve means located between said fan and the connection to said flow chambers for regulating the flow through each of said chambers, said housing includes a cover portion having said material inlet and said gas outlet, and a plate pivotal to said cover portion adjacent said inlet adapted to extend with its end downwardly to the level of the material in said material chamber.

18. A device for treating a granular material with a treatment gas, comprising a housing having an interior defining a granular material bed chamber with an inlet adjacent one end of said chamber and an outlet adjacent the opposite end of said chamber for said granular material, a treatment gas outlet adjacent the top of said chamber, adjustable granular material overflow means separating the bed chamber from said outlet for the granular material, a gas-permeable support plate extending across the bottom of said granulated material bed chamber from said inlet to said outlet for the granular material and providing a support for the granular material during its treatment and movement, a fan having a discharge connected to said housing below said support plate, a partition dividing said housing below said support plate into at least two gas flow chambers, and valve means located between said fan and the connection to said flow chambers for regulating the flow through each of said chambers, the connection between said fan and the underside of said support plate is divided into identical flow area portions below said plate related to the direction of flow of material on said plate, said flow areas each being connected to said fan for directing a gas through said plate and said chambers, said fan connection to said support plate includes a distributor channel, a rotary flap in said distributor channel, means connected to said flap to rotate said flap, said channel being divided and having a flap in each part located to periodically close the associated part for regulating the flow of treatment gas therethrough.

19. A device for treating a granular material with a treatment gas, comprising a housing having an interior defining a granular material bed chamber with an inlet adjacent one end of said chamber and an outlet adjacent the opposite end of said chamber for said granular material, a treatment gas outlet adjacent the top of said chamber, adjustable granular material overflow means separating the bed chamber from said outlet for the granular material, a gas-permeable support plate extending across the bottom of said granulated material bed chamber from said inlet to said outlet for the granular material and providing a support for the granular material during its treatment and movement, a fan having a discharge connected to said housing below said support plate, a partition dividing said housing below said support plate into at least two gas flow chambers, and valve means located between said fan and the connection to said flow chambers for regulating the flow through each of said chambers, said fan including control means associated therewith for directing a pulsating gas flow along the length of said plate which passes through said plate simultaneously along no more than half the area thereof.

* * * * *